(12) United States Patent
Rodrigues et al.

(10) Patent No.: US 11,319,781 B2
(45) Date of Patent: May 3, 2022

(54) NONRESIDENT SYSTEM AND METHOD FOR DEPRESSURISING SUBSEA APPARATUS AND LINES

(71) Applicant: PETRÓLEO BRASILEIRO S.A.—PETROBRAS, Rio de Janeiro (BR)

(72) Inventors: Roberto Rodrigues, Rio de Janeiro (BR); Carlos Alberto Bandeira Ribeiro, Rio de Janeiro (BR); Daniel Monteiro Pimentel, Rio de Janeiro (BR); Everton Da Rocha Nascimento, Macae (BR); Renato De Freitas Soares, Niterói (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/275,596

(22) PCT Filed: Sep. 10, 2019

(86) PCT No.: PCT/BR2019/050383
§ 371 (c)(1),
(2) Date: Mar. 11, 2021

(87) PCT Pub. No.: WO2020/051659
PCT Pub. Date: Mar. 19, 2020

(65) Prior Publication Data
US 2022/0034200 A1 Feb. 3, 2022

(30) Foreign Application Priority Data

Sep. 12, 2018 (BR) .......................... 1020180684280

(51) Int. Cl.
*E21B 43/013* (2006.01)
*E21B 33/038* (2006.01)
(Continued)

(52) U.S. Cl.
CPC .......... *E21B 43/013* (2013.01); *E21B 33/038* (2013.01); *E21B 37/06* (2013.01);
(Continued)

(58) Field of Classification Search
CPC .. E21B 43/013; E21B 43/0175; E21B 33/038; E21B 37/06; F16L 1/205; F16L 1/26; B63G 2008/007
See application file for complete search history.

(56) References Cited

U.S. PATENT DOCUMENTS 9,797,223 B1 10/2017 Gordon
2004/0216885 A1* 11/2004 Bartlett ................. E21B 33/035
166/343

(Continued)

FOREIGN PATENT DOCUMENTS

BR      PI0904467       7/2011
WO      WO 2012149620   11/2012

OTHER PUBLICATIONS

International Search Report and Written Opinion in International Application No. PCT/BR2019/050383, dated Nov. 26, 2019, 8 pages (English Abstract).

*Primary Examiner* — Aaron L Lembo
(74) *Attorney, Agent, or Firm* — Mintz Levin Cohn Ferris Glovsky and Popeo, P.C.

(57) ABSTRACT

The present invention provides a nonresident system for depressurizing subsea apparatus and lines comprising a depressurizing tool (5) adapted for being coupled to an ROV interface (6) of a subsea apparatus, wherein the depressurizing tool (5) is coupled to an ROV (4), wherein: the ROV interface (6) comprises a first pipeline (6a) for connection to a first hydrocarbon transport line (8), a second pipeline (6b) for connection to second hydrocarbon transport line (9), and a connection mandrel (6d); and the depressurizing tool (5) comprises a suction line (5a) adapted for being connected to (Continued)

the first pipeline (6a) for connection to the first hydrocarbon transport line; a discharge line (5b) adapted for being connected to the second pipeline (6b) for connection to the second hydrocarbon transport line; a pump (5c); and a connector (5d) adapted for being connected to the connection mandrel (6d) of the ROV interface (6). A method is also provided for depressurizing subsea apparatus and lines, comprising the steps of: removing a blind cap (15) from an ROV interface (6) with aid of an ROV (4); coupling a depressurizing tool (5) to the ROV interface (6) of a subsea apparatus (10); suction and removal of fluid from a first hydrocarbon transport line, wherein the first hydrocarbon transport line comprises hydrate formation; and pressurizing and reinjecting the fluid into a second hydrocarbon transport line.

12 Claims, 4 Drawing Sheets

(51) Int. Cl.
*E21B 37/06* (2006.01)
*F16L 1/20* (2006.01)
*E21B 43/017* (2006.01)
*F16L 1/26* (2006.01)
*B63G 8/00* (2006.01)

(52) U.S. Cl.
CPC .......... *E21B 43/0175* (2020.05); *F16L 1/205* (2013.01); *F16L 1/26* (2013.01); *B63G 2008/007* (2013.01)

(56) References Cited

U.S. PATENT DOCUMENTS

| | | |
|---|---|---|
| 2010/0051279 A1 | 3/2010 | Baugh et al. |
| 2010/0089126 A1* | 4/2010 | Sweeney .................. F16L 1/26 73/40 |
| 2021/0108480 A1* | 4/2021 | Galle .................... E21B 33/035 |

* cited by examiner

NONRESIDENT SYSTEM AND METHOD FOR DEPRESSURISING SUBSEA APPARATUS AND LINES

CROSS-REFERENCE TO RELATED APPLICATIONS

This application is a U.S. national phase filing under 35 U.S.C. § 371 of International Application No. PCT/BR2019/050383, filed Sep. 10, 2019 and claims priority to Brazilian Application No. BR 10 2018 068428 0, filed Sep. 12, 2018. The entire contents of the prior applications are incorporated herein by reference in their entity.

FIELD OF THE INVENTION

The present invention relates to technologies for pumping and discharge of oil from subsea wells. More particularly, the present invention relates to systems for depressurizing subsea apparatus and lines.

BACKGROUND OF THE INVENTION

The present invention relates to the field of systems for production of oil and hydrocarbons in general, in deep water, which use methods to guarantee flow to prevent or remove blockage by hydrates.

In this connection, to increase offshore oil production or make it viable, mainly in deep water, various systems and apparatus have been developed in the prior art. Said apparatus is generally installed on the sea bed in various positions, between the wellhead up to the foot of the riser, such as, for example, on a wet Christmas tree, pumping units, manifolds, subsea lines, among others.

In general, the oil production obtained from each subsea well is discharged, individually or combined with the production from other wells, through subsea lines and risers to a production unit, such as an FPSO (Floating Production Storage Offloading).

However, in the case of deepwater oil production there is a risk of hydrate formation, the result of direct contact of gas and water, in certain conditions of high pressure and low temperature, for example: 20 kg/cm$^2$ and 4° C.

Despite the advent of various techniques for oil production and prevention of hydrate, at times it is still necessary to use naval resources, such as sophisticated vessels or rigs, classified and approved for receiving hydrocarbons on board, for carrying out operations for remedying blocking with hydrates.

Besides the high cost involved in the use of these naval resources, it is necessary to wait for them to become available and to be moved, and tens of days may pass until it becomes possible to carry out these operations. Thus, interruption of production may be very damaging for the industry.

Some documents of the prior art already deal with various ways of combating hydrate formation in subsea apparatus, as will be presented hereunder.

Document US20100051279A1 discloses a method for preventing hydrate formation in a subsea pipeline, which involves heating a volume of water to a high temperature and increasing the flow of water in the line. It is also described that an ROV is used for heating a volume of seawater and pumping this heated water into a subsea line at the point where hydrate formation is identified.

Document WO2012149620A1 discloses a system for depressurizing fluid and subsea apparatus that comprises a pump outlet or a hydraulic pump, which is operated remotely in the ascending direction by a remotely operated vehicle (ROV). This document further envisages that the system comprises a WCT cap with a depressurizing system, implemented by an electric pump supplied electrically by a power cable from the PU. It is also described that the valves allow a suction point to be selected, which may be on the: production line, annulus line or production string. The valves also allow a discharge point to be selected, which may be in the: production line, annulus line or production string.

Thus, document WO2012149620A1 basically describes a depressurizing system resident on the subsea apparatus, which has the advantage that it can be operated quickly and remotely from the production unit, without being dependent on a vessel and ROV.

However, the fact that the system is resident presents the disadvantage of adding a number of new elements to the subsea apparatus where hydrate formation is to be combated, which increases the complexity of the operation, besides significantly increasing the costs of the system. In addition, the system disclosed in WO2012149620A1 requires mobilization of an offshore rig for installing and dismantling the subsea apparatus, which also increases the final cost of the operation.

Thus, the present invention aims to solve the problems of the prior art by providing a system for combating hydrate formation in subsea apparatus for exploration for petroleum and hydrocarbons, which is nonresident, and depends exclusively on the mobilization of a vessel with ROV for operation thereof.

Accordingly, it is clear that in the state of the art there is still space for the development and use of systems and tools operated by subsea robots of the ROV (Remotely Operated Vehicle) or AUV (Autonomous Underwater Vehicle) type, which perform operations of depressurization of lines and apparatus without the need to return hydrocarbons to support vessels.

As will be presented in greater detail hereunder, the present invention aims to solve the problems of the prior art described above in a practical and efficient manner.

SUMMARY OF THE INVENTION

The aim of the present invention is to provide a system that performs operations of depressurization of lines and apparatus without the need to return hydrocarbons to support vessels, in which the system is nonresident (with respect to the subsea apparatus), and depends exclusively on the mobilization of a vessel with ROV for its operation.

In order to achieve the aims described above, the present invention provides a nonresident system for depressurizing subsea apparatus and lines comprising a depressurizing tool adapted for being coupled to an ROV interface of a subsea apparatus, in which the depressurizing tool is coupled to an ROV, wherein: the one ROV interface comprises a first connecting pipeline to a first hydrocarbon transport line, a second connecting pipeline to a second hydrocarbon transport line, and a connection mandrel; and the depressurizing tool comprises a suction line adapted for being connected to the first connecting pipeline to the first hydrocarbon transport line; a discharge line adapted for being connected to the second connecting pipeline to the second hydrocarbon transport line; a pump; and a connector adapted for connecting the connection mandrel of the ROV interface.

The present invention further provides a method for depressurizing subsea apparatus and lines, comprising the steps of: removing a blind cap from an ROV interface with the aid of an ROV; coupling a depressurizing tool to the ROV interface of a subsea apparatus; suction and removal of fluid from a first hydrocarbon transport line, wherein the first hydrocarbon transport line comprises hydrate formation; and pressurizing and reinjecting the fluid into a second hydrocarbon transport line.

BRIEF DESCRIPTION OF THE FIGURES

The detailed description presented hereunder refers to the appended figures and the respective reference numbers.

DETAILED DESCRIPTION OF THE INVENTION

Firstly, it is emphasized that the description given hereunder will be based on a preferred embodiment of the invention. As will be obvious to a person skilled in the art, however, the invention is not limited to this particular embodiment.

More generally, the invention relates to an oil production system that comprises a wet Christmas tree (WCT), installed on a subsea well, which is connected via a production line and an annulus line to a Floating Production Unit (such as an FPSO).

According to the embodiment presented, the WCT is provided with an ROV interface with two hydraulic connection points, one connected hydraulically to the production line and the other connected hydraulically to the annulus line.

In a completely innovative manner, via this ROV interface it is possible to couple a depressurizing tool, transported and operated by ROV (or AUV), with the functions of: withdrawing fluid from a first line; pumping; and returning the fluid to a second line, so as to permit depressurization of any one of the lines (first or second line), either the production line or the annulus line, without returning fluid to a support vessel.

Accordingly, the invention provides a subsea production system with an interface to an ROV (or AUV), with the function of promoting depressurization of production or annulus lines without necessarily using a support vessel classified for receiving hydrocarbons.

The system of the invention may therefore be used for preventing or remedying hydrates in subsea lines and apparatus, via an ROV interface for coupling and operating depressurizing systems and tools.

The ROV interface, as will be described in detail in this specification, consists of pipes and shut-off valves, which can be replaced quickly in case of failure. This means that system maintenance and repair can be carried out quickly and with little cost involved.

Thus, the invention allows the subsea production system to undergo operations of depressurization of lines and risers by means of a quick system operated with aid of an ROV or AUV.

In simplified terms, the system for depressurizing lines and apparatus of the invention makes it possible for fluid to be withdrawn from a first line blocked by hydrate and reinjected into a second line. Additionally, a hydrate inhibiting fluid, for example ethanol or methanol, may be injected into both lines to prevent the dissolved hydrate forming again.

Thus, the system described hereunder makes the oil production system safer and more robust, since it facilitates the depressurizing of production lines for remedying hydrates, without returning hydrocarbons to support vessels.

Figure 1:
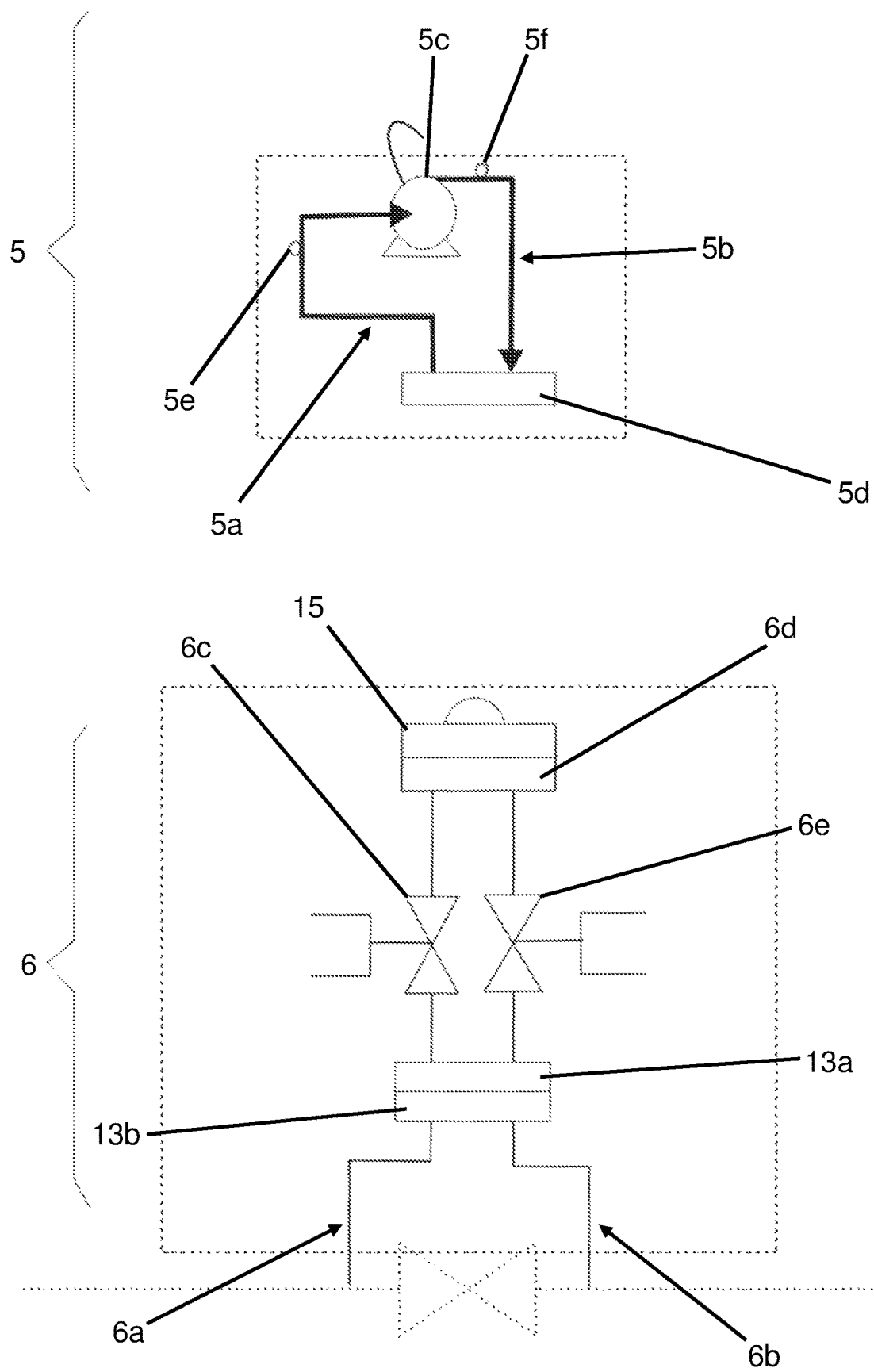
FIG. 1 illustrates schematically an ROV interface and a depressurizing tool operated by ROV according to an optional configuration of the nonresident system for depressurizing subsea apparatus and lines.

FIG. 1 illustrates schematically the main components of the nonresident system for depressurizing subsea apparatus and lines of the present invention, which comprises an ROV interface 6 and a depressurizing tool 5 operated by ROV, according to an optional embodiment of the present invention.

It should be noted that the ROV interface 6 basically consists of a first pipeline 6a for connection to a first hydrocarbon transport line, a second pipeline 6b for connection to a second hydrocarbon transport line, a first shut-off valve 6c operated by ROV, a connection mandrel 6d and a second shut-off valve 6e operated by ROV.

In the specific configuration illustrated, the first connecting pipeline 6a makes a connection to a production line 8, while the second connecting pipeline 6b makes a connection to an annulus line 9. However, the invention may be applied to any known pipeline for transport of hydrocarbons, as would be obvious to any person skilled in the art.

Figure 2:
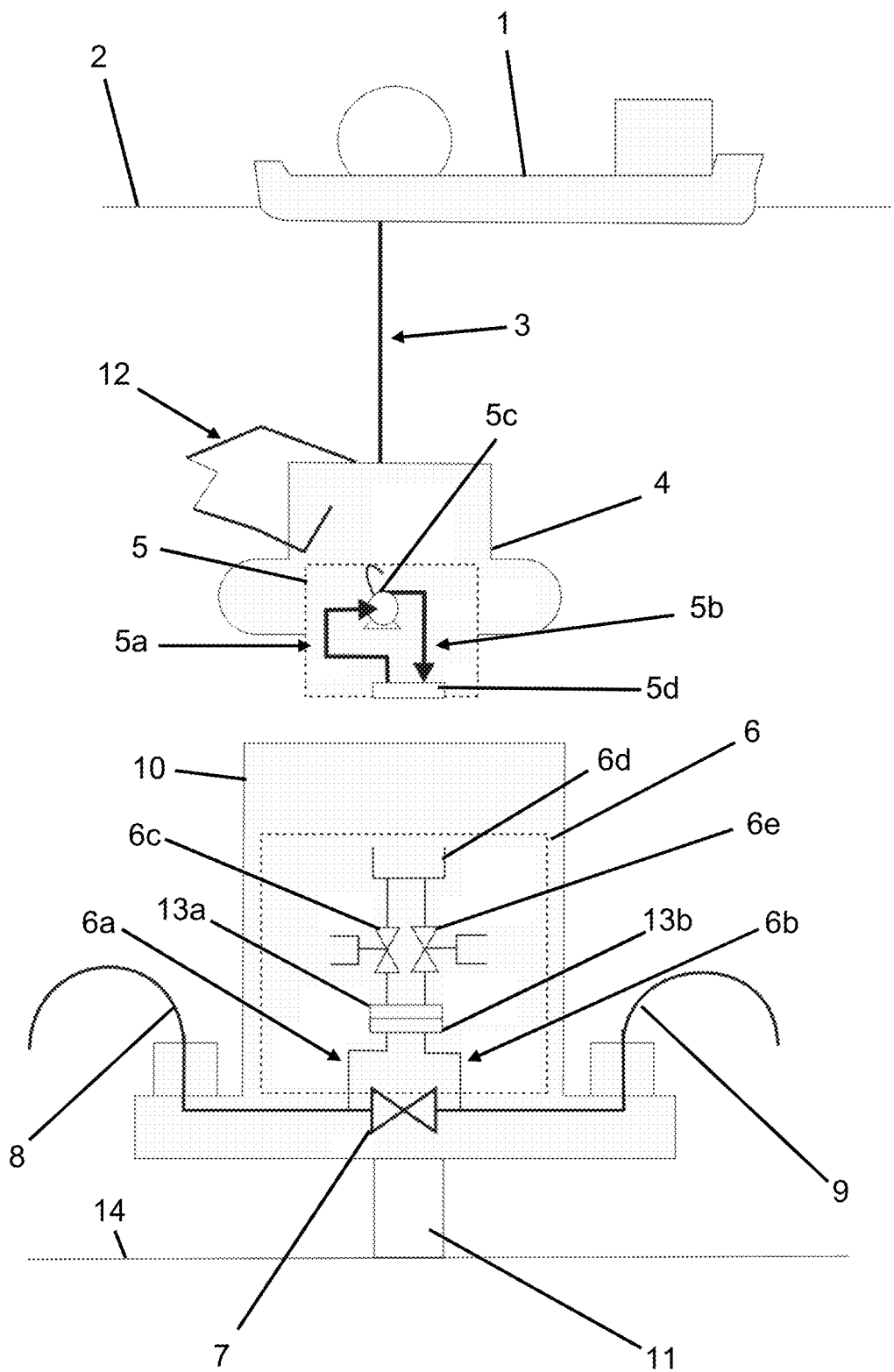
FIG. 2 illustrates the approach of a depressurizing tool to an ROV interface integrated with a WCT, according to an optional configuration of the system of the present invention.
Figure 3:
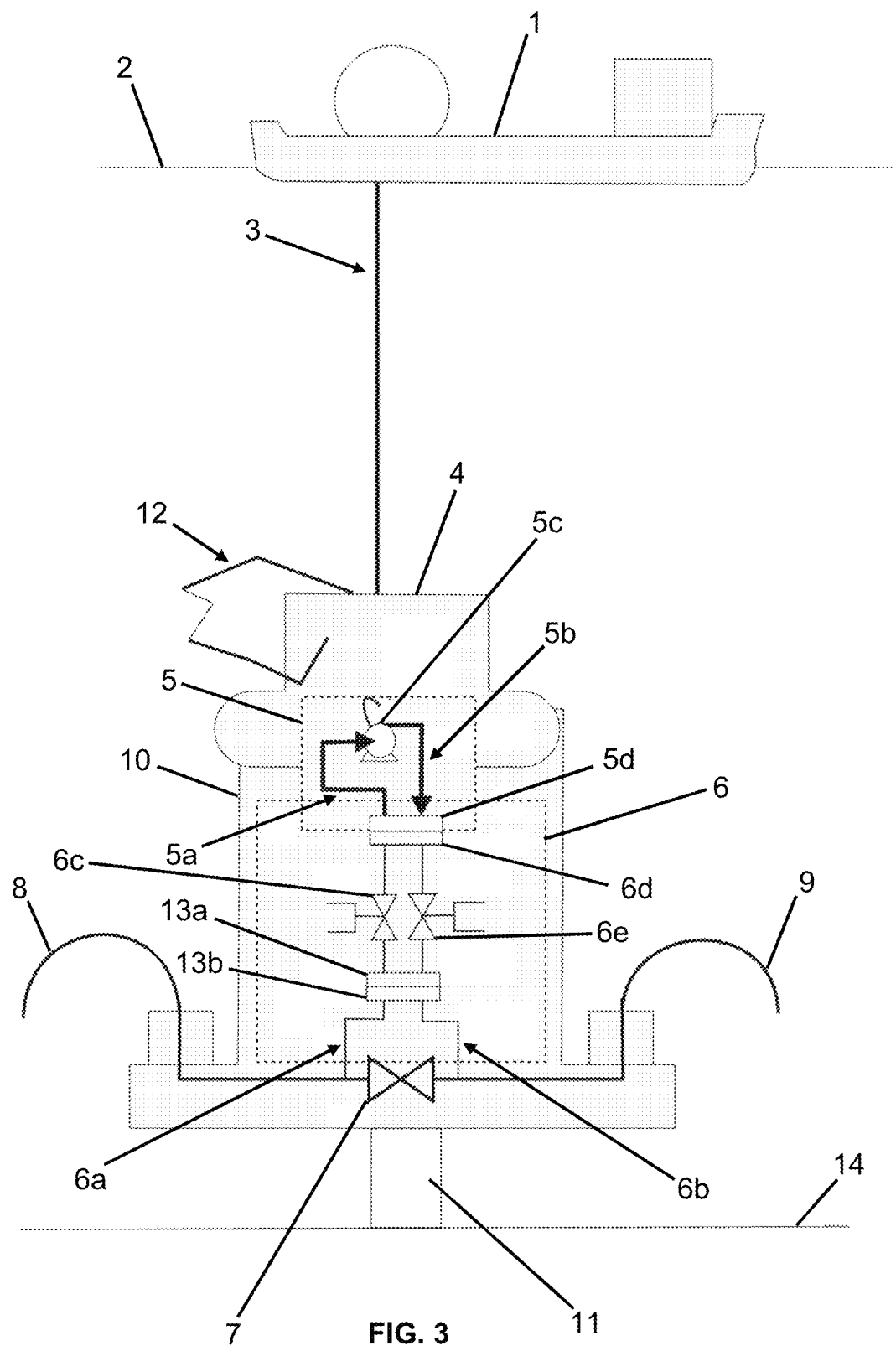
FIG. 3 illustrates a depressurizing tool connected to an ROV interface integrated with a WCT, according to an optional configuration of the system of the present invention.

FIGS. 2 and 3 illustrate schematically the approach of a depressurizing tool 5 to an ROV interface 6 integrated with a WCT 10, according to an optional configuration of the present invention. Thus, we may observe, in sequence, connection of a depressurizing tool 5 to an interface 6 integrated in a WCT 10.

Note that the depressurizing tool 5 is coupled to the ROV 4, which is responsible for making the connection between the depressurizing tool 5 and the ROV interface 6.

According to this embodiment, the depressurizing tool 5 basically comprises: a suction line 5a adapted for being connected to the first pipeline 6a for connection to the first hydrocarbon transport line; a discharge line 5b adapted for being connected to the second pipeline 6b for connection to the second hydrocarbon transport line; a pump 5c; and a connector 5d.

Optionally, at least one pressure measuring device 5e, 5f may also be coupled to the depressurizing tool 5, to facilitate control and monitoring of the depressurizing operation. The quantity and position of the sensors may vary from that illustrated in FIG. 1, so that this is not a limiting feature.

It is important to point out that, although it is illustrated that the suction line 5a is connected hydraulically to the production line 8, while the discharge line 5b is connected hydraulically to the annulus line 9, the opposite is also envisaged by the present invention.

In this alternative configuration, the suction line 5a would be connected hydraulically to the annulus line 9, while the discharge line 5b would be connected hydraulically to the production line 8.

Thus, the invention envisages that suction may take place in either one of the annulus line 9 and production line 8, while discharge will be able to take place in either one of the production line 8 and annulus line 9, respectively. The decision regarding which configuration will be adopted will be made case by case, wherein the pipeline to undergo suction will preferably be the line in which formation of blocking by hydrate is identified.

In the optional configuration illustrated, the coupling between the depressurizing tool 5 and the ROV interface 6 allows the production line 8 to undergo suction. For this, the fluid withdrawn is pressurized by the pump 5c and reinjected into the annulus line 9.

The invention also envisages that the opposite route is adopted, i.e. that the annulus line 9 is to undergo suction, wherein the fluid withdrawn is pressurized by the pump 5c and reinjected into the production line 8.

Thus, the decision as to which line (production line 8 or annulus line 9) is to undergo suction will be made case by case, wherein the line to undergo suction will preferably be the hydrated line, i.e. the line that is affected by blocking with hydrate.

Thus, it is possible to promote depressurization of either one of the two subsea lines, production line 8 and annulus line 9, with return to the other line.

To facilitate comprehension of the invention, FIGS. 2 and 3 further illustrate the other elements present in the overall system and in the environment, such as service vessel 1, sea surface 2, umbilical 3, ROV 4, depressurizing tool 5, ROV interface 6, pig crossover valve 7, WCT assembly 10, subsea wellhead 11, ROV arms 12, connector 13, blind cap 15, and sea bottom 14.

Thus, in general, the concept adopted by the invention makes use of apparatus and components used conventionally in a conventional line. This makes the invention easier to implement.

It is emphasized that the major advantage of the invention resides in the form in which these pieces of apparatus are interconnected and used, for providing a system that is much more efficient than those available in the prior art.

Again with regard to the figures, it is important to note that the WCT assembly 10 is an apparatus for subsea well safety and control consisting of various valves, including master, swab and wing for production line and annulus line. These valves are not shown in the figures, since the interface is downstream of these valves, which are not involved in the operation and description of the system according to the present invention.

It is also fundamental to emphasize that, although not shown in the figures, the ROV interface 6 of the present invention can be connected to other subsea apparatus, such as: pumping unit, manifolds, among others, wherein its operation takes place in the same way as described in the configuration in which the interface is applied to a WCT 10, as described up to here on the basis of the optional configurations illustrated in the figures.

Figure 4:
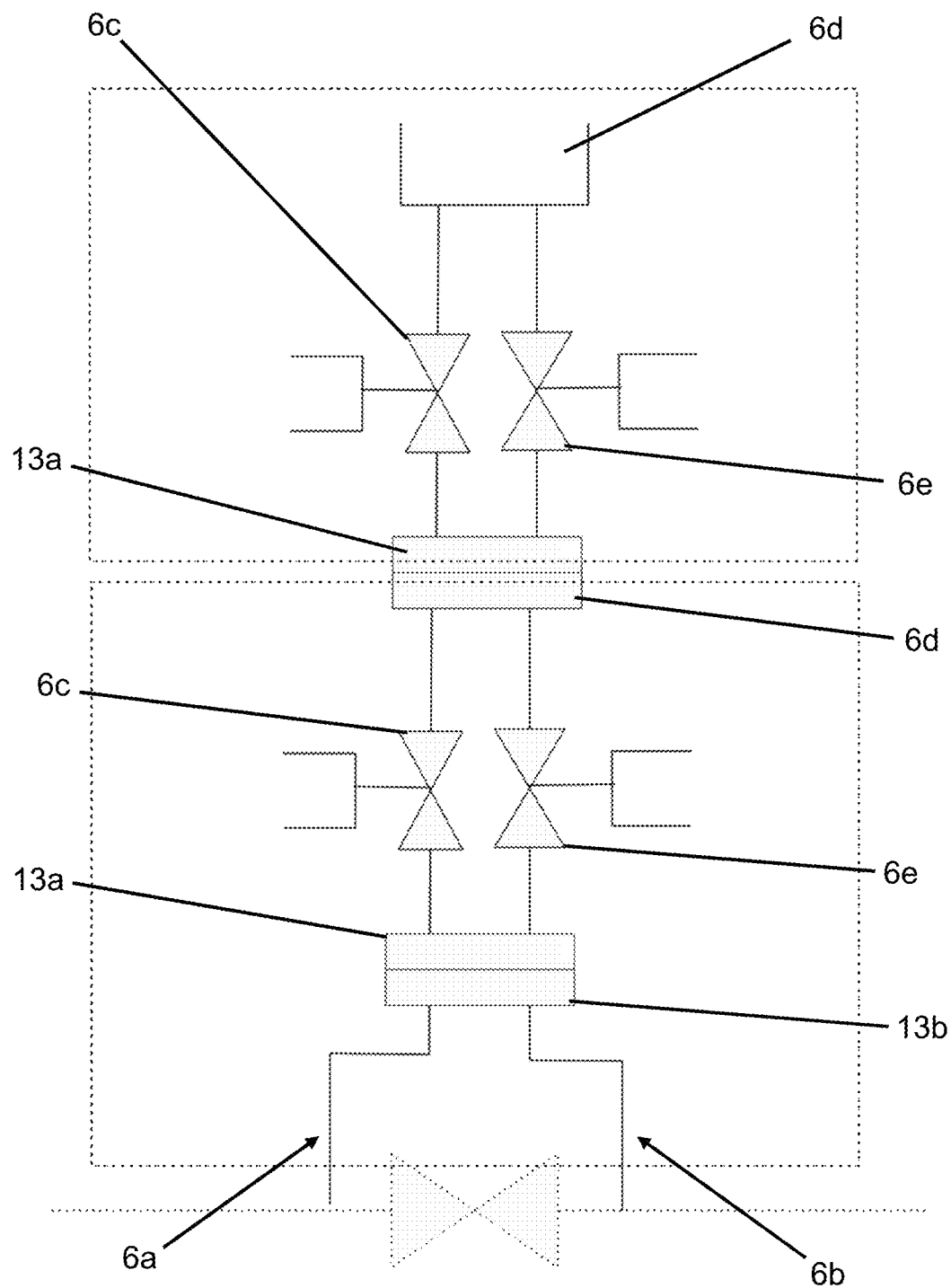
FIG. 4 illustrates a configuration in which a second reserve ROV interface is mounted on the first ROV interface, according to an optional configuration of the system of the present invention.

Referring to FIG. 4, it can be seen that a configuration is illustrated in which a second reserve ROV interface 6a is mounted on the first ROV interface 6. This configuration may be adopted if there is a fault in the first ROV interface 6. This configuration allows the repair to be expedited, avoiding having to remove the first ROV interface 6, and its disconnection by means of connector 13.

Therefore, besides the system described, the invention also provides a method for depressurizing subsea apparatus and lines comprising the following steps: removing the blind cap 15 with aid of an ROV 4; coupling the depressurizing tool 5 to the ROV interface 6; suction and removal of fluid from the hydrated line; pressurizing and reinjecting the fluid into the line without blockage; uncoupling the depressurizing tool 5; and refitting the blind cap 15.

Optionally, the method of the present invention further comprises a step of simultaneous injection of hydrate inhibitor into both lines throughout the operation.

In conclusion, it can be said that the present invention represents an innovative solution for a depressurizing system for subsea lines and apparatus by ROV or AUV, without the need to use vessels that receive hydrocarbons on board. This advantage can only be obtained because the depressurizing system is nonresident, i.e. it is not fixed to the subsea apparatus (10), but is coupled to an ROV.

Thus, the invention solves the problems of the prior art in that it provides a system, basically nonresident, which in its turn requires and depends on the mobilization of a vessel with an ROV for its operation, but has the advantage of only requiring slight modifications to the subsea apparatus.

Thus, the complexity of the system is transferred entirely to a single tool, which is easy to maintain and can be mobilized and applied for a set of wells and subsea apparatus, when necessary.

Numerous variations falling within the scope of protection of the present application are permitted. This reinforces the fact that the present invention is not limited to the particular configurations/embodiments described above.

The invention claimed is:

1. A nonresident system for depressurizing subsea apparatus and lines comprising a depressurizing tool adapted for being coupled to an ROV interface of a subsea apparatus, characterized in that the depressurizing tool is coupled to an ROV, wherein:
   the ROV interface comprises a first pipeline for connection to a first hydrocarbon transport line, a second pipeline for connection to a second hydrocarbon transport line, and a connection mandrel; and
   the depressurizing tool comprises a suction line adapted for being connected to the first pipeline for connection to the first hydrocarbon transport line; a discharge line adapted for being connected to the second pipeline for connection to the second hydrocarbon transport line; a pump; and a connector adapted for being connected to the connection mandrel of the ROV interface.

2. The system as claimed in claim 1, wherein:
   the first hydrocarbon transport line comprises one of: a production line; and an annulus line, and
   the second hydrocarbon transport line comprises one of: a production line; and an annulus line.

3. The system as claimed in claim 2, wherein:
   the ROV interface comprises a first shut-off valve operated by ROV, and a second shut-off valve operated by ROV.

4. The system as claimed in claim 1, wherein the suction line is connected hydraulically to a hydrocarbon transport line that comprises a blockage by hydrate.

5. The system as claimed in claim 1, wherein a WCT is coupled to a subsea wellhead via a connector and a pig crossover valve.

6. The system as claimed in claim 5, wherein the ROV is connected to a service vessel on the sea surface via an umbilical.

7. The system as claimed in claim 1, wherein the ROV interface comprises a blind cap adapted for protecting the connection mandrel when the depressurizing tool is not coupled.

8. The system as claimed in claim 7, wherein the depressurizing tool comprises at least one pressure measuring device.

9. The system as claimed in claim 7, wherein the ROV comprises arms adapted for performing a plurality of tasks, including connection between the depressurizing tool and the ROV interface, and control of valves.

10. A method for depressurizing subsea apparatus and lines, comprising:
 removing a blind cap from an ROV interface with aid of an ROV;
 coupling a depressurizing tool to the ROV interface of a subsea apparatus;
 suction and removal of fluid from a first hydrocarbon transport line, wherein the first hydrocarbon transport line comprises hydrate formation; and
 pressurizing and reinjecting the fluid into a second hydrocarbon transport line.

11. The method as claimed in claim 10, comprising:
 uncoupling the depressurizing tool from the ROV interface of the subsea apparatus; and
 refitting the blind cap.

12. The method as claimed in claim 10, comprising simultaneous injection of hydrate inhibitor into the first and into the second hydrocarbon transport line throughout the operation.

* * * * *

UNITED STATES PATENT AND TRADEMARK OFFICE
CERTIFICATE OF CORRECTION

| | |
|---|---|
| PATENT NO. | : 11,319,781 B2 |
| APPLICATION NO. | : 17/275596 |
| DATED | : May 3, 2022 |
| INVENTOR(S) | : Roberto Rodrigues et al. |

It is certified that error appears in the above-identified patent and that said Letters Patent is hereby corrected as shown below:

On the Title Page

Item (72), Lines 2 and 3, please delete "Carlos Alberto Bandeira Ribeiro" and insert -- Carlos Alberto Bandeira Ribeiro Cardoso --.

Signed and Sealed this
Twenty-fourth Day of September, 2024

Katherine Kelly Vidal
*Director of the United States Patent and Trademark Office*